(12) United States Patent
Park et al.

(10) Patent No.: US 10,410,381 B2
(45) Date of Patent: Sep. 10, 2019

(54) METHOD AND APPARATUS FOR PROCESSING TOMOGRAPHIC IMAGE

(71) Applicant: Samsung Electronics Co., Ltd., Gyeonggi-do (KR)

(72) Inventors: Jun-young Park, Gyeonggi-do (KR); Yeon-mo Jeong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/668,987

(22) Filed: Aug. 4, 2017

(65) Prior Publication Data

US 2018/0047188 A1 Feb. 15, 2018

(30) Foreign Application Priority Data

Aug. 11, 2016 (KR) .................. 10-2016-0102440

(51) Int. Cl.
*G06T 11/00* (2006.01)

(52) U.S. Cl.
CPC .......... *G06T 11/003* (2013.01); *G06T 11/005* (2013.01); *G06T 2211/421* (2013.01)

(58) Field of Classification Search
CPC . G06T 11/003; G06T 11/005; G06T 2211/421
See application file for complete search history.

(56) References Cited

U.S. PATENT DOCUMENTS

| | | | |
|---|---|---|---|
| 6,393,090 B1 * | 5/2002 | Hsieh | A61B 6/022 378/20 |
| 7,313,261 B2 | 12/2007 | Dehmeshki | |
| 7,489,825 B2 | 2/2009 | Sirohey et al. | |
| 8,520,019 B1 * | 8/2013 | Freyhult | G06F 3/0481 345/581 |
| 8,520,028 B1 | 8/2013 | Freyhult et al. | |
| 9,615,809 B2 | 4/2017 | Lee et al. | |
| 2006/0291612 A1 * | 12/2006 | Nishide | A61B 6/032 378/4 |

(Continued)

FOREIGN PATENT DOCUMENTS

| | | |
|---|---|---|
| JP | 2012-16394 A | 1/2012 |
| KR | 10-2014-0127359 A | 11/2014 |

(Continued)

OTHER PUBLICATIONS

Korean Search Report dated Aug. 29, 2017.
European Search Report dated Nov. 24, 2017.
European Search Report dated Jun. 7, 2019.

*Primary Examiner* — Mekonen T Bekele
(74) *Attorney, Agent, or Firm* — Cha & Reiter, LLC

(57) ABSTRACT

Provided are tomographic image processing apparatus and method. The tomographic image processing apparatus includes: a processor configured to generate a plurality of preview images by applying a plurality of filters to second raw data corresponding to a selected cross-section of an object and reconstruct a tomographic image by applying one of the plurality of filters, which is used to generate a preview image selected from among the plurality of preview images, to first raw data corresponding to a region of the object including the selected cross-section; and a display configured to display the reconstructed tomographic image.

11 Claims, 13 Drawing Sheets

(56) References Cited

U.S. PATENT DOCUMENTS

| | | | |
|---|---|---|---|
| 2008/0144097 A1* | 6/2008 | Yoshida | H04N 1/00411 358/1.15 |
| 2010/0189330 A1* | 7/2010 | Akahori | A61B 6/025 382/131 |
| 2013/0148779 A1 | 6/2013 | Notohara et al. | |
| 2014/0098932 A1* | 4/2014 | Profio | A61B 6/032 378/19 |
| 2014/0098933 A1* | 4/2014 | Profio | A61B 6/03 378/19 |
| 2016/0120495 A1* | 5/2016 | Miyazawa | A61B 6/025 378/21 |
| 2016/0128648 A1* | 5/2016 | Miyazawa | A61B 6/025 378/21 |
| 2016/0128649 A1* | 5/2016 | Miyazawa | A61B 6/025 378/21 |
| 2016/0206273 A1* | 7/2016 | Fukuda | G06T 11/003 |
| 2016/0232691 A1* | 8/2016 | Nishii | A61B 6/025 |
| 2018/0317867 A1* | 11/2018 | Boone | A61B 6/0435 |

FOREIGN PATENT DOCUMENTS

| | | |
|---|---|---|
| KR | 10-2015-0095184 A | 8/2015 |
| WO | 2015/186513 A1 | 12/2015 |

\* cited by examiner

METHOD AND APPARATUS FOR PROCESSING TOMOGRAPHIC IMAGE

CLAIM OF PRIORITY

This application claims the benefit of Korean Patent Application No. 10-2016-0102440, filed on Aug. 11, 2016, in the Korean Intellectual Property Office, the disclosure of which is incorporated herein in its entirety by reference.

BACKGROUND

1. Field

The present disclosure generally relates to tomographic image processing apparatuses, tomographic image processing methods, and computer-readable recording media having recorded thereon program codes for performing the tomographic image processing methods disclosed herein.

2. Description of the Related Art

Various types of filters may be used to improve the quality of tomographic images. As technology for the filters has advanced, various types of filters have been developed. However, due to increasing variety of filter types, a particular filter's effect on the tomographic image has become difficult to predict. Furthermore, given the variety of filters, users have had difficulties in selecting the appropriate filter necessary for the desired quality or effect to be applied to the tomographic image. Thus, there is a need for methods of easily selecting, from among various types of filters, the appropriate filter for the desired quality or effect.

SUMMARY

Provided are tomographic image processing apparatuses and methods, whereby a user may easily select a filter to be used for reconstructing a tomographic image by displaying a plurality of preview images generated by applying a plurality of filters.

Provided are tomographic image processing apparatuses and methods, whereby a plurality of preview images may be generated at higher speed by using raw data corresponding to a selected cross-section of an object.

Additional aspects will be set forth in part in the description which follows and, in part, will be apparent from the description, or may be learned by practice of the presented embodiments.

According to an aspect of an embodiment, a tomographic image processing apparatus includes: a processor configured to generate a plurality of preview images by applying a plurality of filters to second raw data corresponding to a selected cross-section of an object and reconstruct a tomographic image by applying one of the plurality of filters, which is used to generate a preview image selected from among the plurality of preview images, to first raw data corresponding to a region of the object including the selected cross-section; and a display configured to display the reconstructed tomographic image.

The processor is further configured to generate the plurality of preview images by reconstructing images by applying the plurality of filters to the second raw data and sampling the reconstructed images.

The processor is further configured to update the plurality of preview images to correspond to another cross-section of the object in response to receiving a user input of selecting the other cross-section of the object.

The user input may be an input of moving an indicator indicating the selected cross-section of the object in a scout image.

The tomographic image processing apparatus may further include a data acquisitor configured to acquire the first raw data by performing the tomographic scanning on the region of the object.

The display is further configured to display the plurality of preview images generated by the processor.

Each preview image is generated by applying a different filter to raw data corresponding to a scanned part of the object.

The first raw data may correspond to a segment of the object in the scanned part of the object.

The processor is further configured to receive a user input for selecting one of the plurality of preview images; and reconstruct the tomographic image by apply the filter corresponding to the selected preview image to the first raw data.

According to an aspect of another embodiment, a tomographic image processing method includes: generating a plurality of preview images by applying a plurality of filters to second raw data corresponding to a selected cross-section of an object; reconstructing a tomographic image by applying one of the plurality of filters, which is used to generate a preview image selected from among the plurality of preview images, to first raw data corresponding to a region of the object including the selected cross-section; and displaying the reconstructed tomographic image.

The generating of the plurality of preview images may include reconstructing images by applying the plurality of filters to the second raw data and sampling the reconstructed images.

The tomographic image processing method may further include updating the plurality of preview images to correspond to another cross-section of the object in response to receiving a user input of selecting the other cross-section of the object.

The user input may be an input of moving an indicator indicating the selected cross-section of the object in a scout image.

The tomographic image processing method may further include acquiring the first raw data by performing the tomographic scanning on the region of the object.

The tomographic image processing method may further include displaying the generated plurality of preview images.

Each preview image may be generated by applying a different filter to raw data corresponding to a scanned part of the object.

The first raw data may correspond to a segment of the object in the scanned part of the object.

The tomographic image processing method may further include receiving a user input for selecting one of the plurality of preview images; and reconstructing the tomographic image by apply the filter corresponding to the selected preview image to the first raw data.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
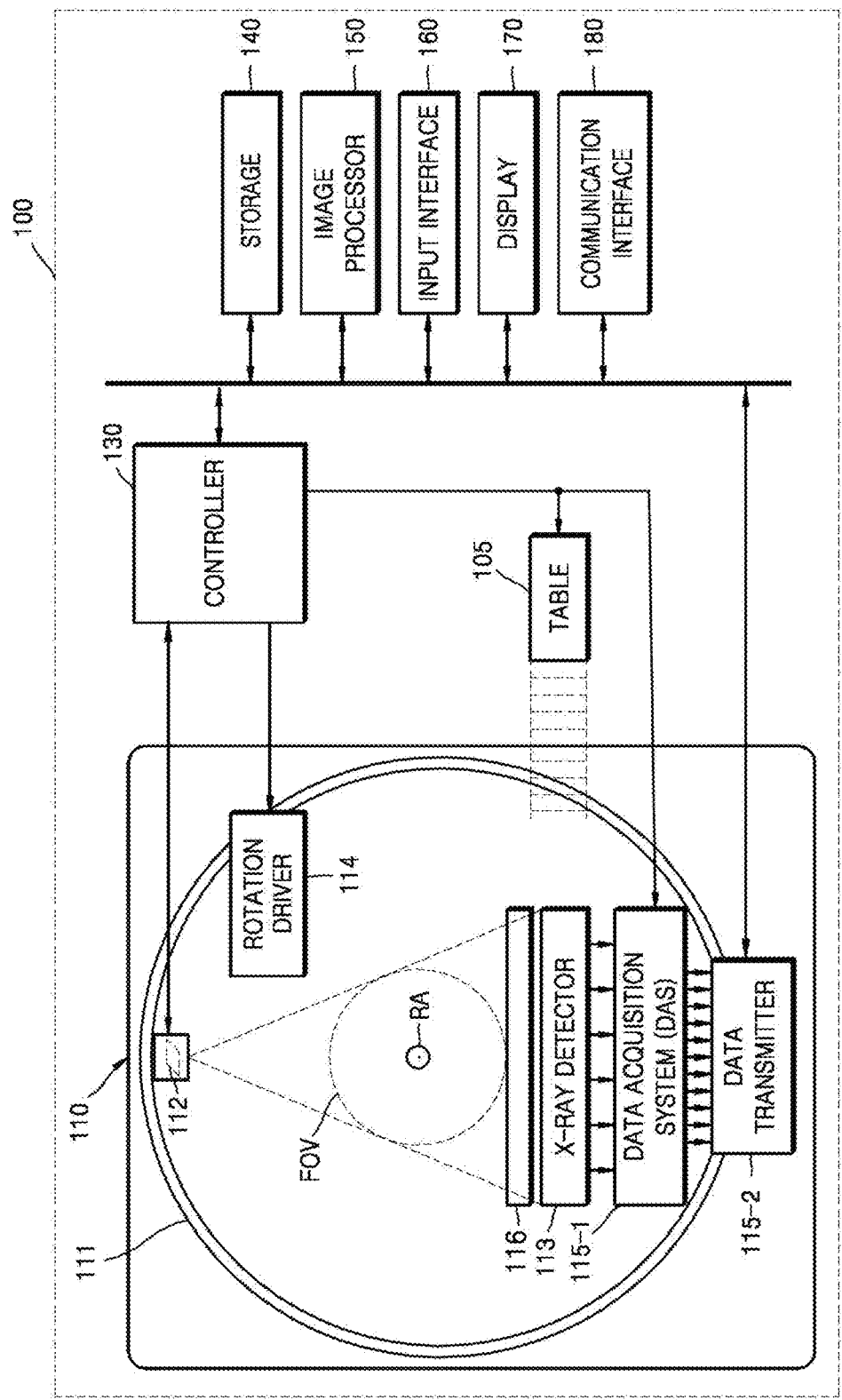
FIG. 1 is a block diagram showing structures of a computed tomography (CT) system according to an embodiment.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The principle of the present invention is explained and embodiments are disclosed so that the scope of the present invention is clarified and one of ordinary skill in the art to which the present invention pertains implements the present invention. The disclosed embodiments may have various forms.

Throughout the specification, like reference numerals or characters refer to like elements. In the present specification, all elements of embodiments are not explained, but general matters in the technical field of the present invention or redundant matters between embodiments will not be described. Terms 'part' and 'portion' used herein may be implemented using software or hardware, and, according to embodiments, a plurality of 'parts' or 'portions' may be implemented using a single unit or element, or a single 'part' or 'portion' may be implemented using a plurality of units or elements. The operational principle of the present invention and embodiments thereof will now be described more fully with reference to the accompanying drawings.

In the present specification, an image may include a medical image obtained by a medical imaging apparatus, such as a computed tomography (CT) apparatus, a magnetic resonance imaging (MRI) apparatus, an ultrasound imaging apparatus, or an X-ray apparatus.

Throughout the specification, the term 'object' is a thing to be imaged, and may include a human, an animal, or a part of a human or animal. For example, the object may include a part of a body (i.e., an organ), a phantom, or the like.

In the present specification, a 'CT system' or 'CT apparatus' refers to a system or apparatus configured to emit X-rays while rotating around at least one axis relative to an object and photograph the object by detecting the X-rays.

In the specification, a "CT image" refers to an image constructed from raw data obtained by photographing an object by detecting X-rays that are emitted as the CT system or apparatus rotates about at least one axis with respect to the object.

According to embodiments of the present disclosure, a three-dimensional (3D) CT image having reduced motion artifacts may be obtained. First, consecutive partial angle reconstruction (PAR) images are produced using an obtained sinogram. Initial motion estimation is performed to minimize an error of each PAR image pair. Thereafter, a refining term is estimated by performing information potential (IP) maximization on a produced PAR stack, and then a motion-compensated image is reconstructed using an updated motion vector field (MVF).

FIG. 1 illustrates a structure of a CT system 100 according to an embodiment.

The CT system 100 may include a gantry 110, a table 105, a controller 130, a storage 140, an image processor 150, an input interface 160, a display 170, and a communication interface 180.

The gantry 110 may include a rotating frame 111, an X-ray generator 112, an X-ray detector 113, a rotation driver 114, and a readout device 115.

The rotating frame 111 may receive a driving signal from the rotation driver 114 and rotate around a rotation axis (RA).

An anti-scatter grid 116 may be disposed between an object and the X-ray detector 113 and may transmit most of primary radiation and attenuate scattered radiation. The object may be positioned on the table 105 which may move, tilt, or rotate during a CT scan.

The X-ray generator 112 receives a voltage and a current from a high voltage generator (HVG) to generate and emit X-rays.

The CT system 100 may be implemented as a single-source CT system including one X-ray generator 112 and one X-ray detector 113, or as a dual-source CT system including two X-ray generators 112 and two X-ray detectors 113.

The X-ray detector 113 detects radiation that has passed through the object. For example, the X-ray detector 113 may detect radiation by using a scintillator, a photon counting detector, etc.

Methods of driving the X-ray generator 112 and the X-ray detector 113 may vary depending on scan modes used for scanning of the object. The scan modes are classified into an axial scan mode and a helical scan mode, according to a path along which the X-ray detector 113 moves. Furthermore, the scan modes are classified into a prospective mode and a retrospective mode, according to a time interval during which X-rays are emitted.

The controller 130 may control an operation of each of the components of the CT system 100. The controller 130 may include a memory configured to store program codes for performing a function or data and a processor configured to process the program codes or the data. The controller 130 may be implemented in various combinations of at least one memory and at least one processor. The processor may generate or delete a program module according to an operating status of the CT system 100 and process operations of the program module.

The readout device 115 receives a detection signal generated by the X-ray detector 113 and outputs the detection signal to the image processor 150. The readout device 115 may include a data acquisition system (DAS) 115-1 and a data transmitter 115-2. The DAS 115-1 uses at least one amplifying circuit to amplify a signal output from the X-ray detector 113, and outputs the amplified signal. The data transmitter 115-2 uses a circuit such as a multiplexer (MUX) to output the signal amplified in the DAS 115-1 to the image processor 150. According to a slice thickness or a number of slices, only some of a plurality of pieces of data collected by the X-ray detector 113 may be provided to the image processor 150, or the image processor 150 may select only some of the plurality of pieces of data.

The image processor 150 obtains tomographic data from a signal obtained by the readout device 115 (e.g., pure data that is data before being processed). The image processor 150 may pre-process the obtained signal, convert the obtained signal into tomographic data, and post-process the tomographic data. The image processor 150 may perform some or all of the processes described herein, and the type or order of processes performed by the image processor 150 may vary according to embodiments.

The image processor 150 may perform pre-processing, such as a process of correcting sensitivity irregularity between channels, a process of correcting a rapid decrease of signal strength, or a process of correcting signal loss due to an X-ray absorbing material, on the signal obtained by the readout device 115.

According to embodiments, the image processor 150 may perform some or all of the processes for reconstructing a tomographic image, to thereby generate the tomographic data. According to an embodiment, the tomographic data may be in the form of data that has undergone back-projection, or in the form of a tomographic image. According to embodiments, additional processing may be performed on the tomographic data by an external device such as a server, a medical apparatus, or a portable device.

To obtain a tomographic image, the CT system 100 performs tomographic scanning on an object to acquire raw data. The CT system 100 generates and emits, via the X-ray generator 112, X-rays towards the object, and detects, via the X-ray detector 113, the X-rays that have passed through the object. The X-ray detector 113 also generates raw data corresponding to the detected X-rays. The raw data may refer to data before being reconstructed into a tomographic image by the image processor 150. Raw data is a set of data values corresponding to intensities of X-rays that have passed through the object, and may include projection data or a sinogram. The data that has undergone back-projection is obtained by performing back-projection on the raw data by using information about an angle at which X-rays are emitted. The tomographic image is obtained by using image reconstruction techniques including back-projection of the raw data.

The storage 140 is a storage medium for storing control-related data, image data, etc., and may include a volatile or non-volatile storage medium.

The input interface 160 receives control signals, data, etc., from a user. The display 170 may display information indicating an operational status of the CT system 100, medical information, medical image data, etc.

The CT system 100 includes the communication interface 180 and may be connected to external devices, such as a server, a medical apparatus, and a portable device (smartphone, tablet personal computer (PC), wearable device, etc.), via the communication interface 180.

The communication interface 180 may include one or more components that enable communication with an external device. For example, the communication interface 180 may include a short distance communication module, a wired communication module, and a wireless communication module.

The communication interface 180 may receive control signals and data from an external device and transmit the received control signals to the controller 130 so that the controller 130 may control the CT system 100 according to the received control signals.

Alternatively, by transmitting a control signal to an external device via the communication interface 180, the controller 130 may control the external device according to the control signal.

For example, the external device may process data according to a control signal received from the controller 130 via the communication interface 180.

A program for controlling the CT system 100 may be installed on the external device and may include instructions for performing some or all of the operations of the controller 130.

The program may be preinstalled on the external device, or a user of the external device may download the program from a server that provides an application for installation. The server that provides an application may include a recording medium having the program recorded thereon.

According to embodiments, the CT system 100 may or may not use contrast media during a CT scan, and may be implemented as a device connected to other equipment.

Figure 2:
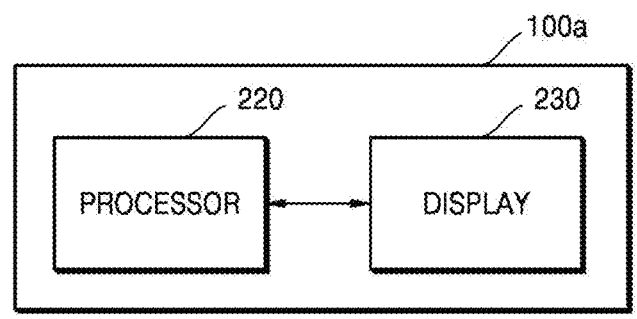
FIG. 2 is a block diagram of a configuration of a tomographic image processing apparatus according to an embodiment.

FIG. 2 is a block diagram of a configuration of a tomographic image processing apparatus 100a according to an embodiment.

According to one embodiment, the tomographic image processing apparatus 100a is an apparatus for processing and displaying tomographic image data and may be implemented as one or more electronic devices. For example, the tomographic image processing apparatus 100a may be implemented as various kinds of devices equipped with a processor and a display, such as a general-purpose computer, a tablet PC, and a smartphone.

To generate a tomographic image with improved quality, the tomographic image processing apparatus 100a may apply various filters to the raw data before reconstructing the tomographic image. According to an embodiment, a filter may be referred to as a filter kernel or kernel, but is not limited thereto. Due to the advancements in the technology for designing filters, the number of types of filters that may be applied for reconstructing a tomographic image has been increasing. Accordingly, it is not easy to select a filter to be applied for reconstructing the tomographic image and predict the quality of the filtered tomographic image. Furthermore, since the tomographic image may be represented by Hounsfield unit (HU) values, the user may have difficulties in predicting the resulting HU values when the filter is applied. According to one or more embodiments disclosed herein, the tomographic image processing apparatus 100a may enable the user to view a plurality of preview images generated using their corresponding filters. The user may then select a desired filter to be applied during reconstruction of the tomographic image based on the plurality of preview images.

However, if a plurality of filters are applied to the entire raw data acquired from tomographic scanning on the object, it may take a long time to generate the plurality of preview images. According to one or embodiments, the tomographic image processing apparatus 100a may generate a plurality of preview images by applying a plurality of filters to only a portion of the raw data, e.g. raw data that correspond to a selected cross-section of the object. Thus, it is possible to reduce the amount of time required to generate the plurality of preview images. Based on the plurality of preview images, the user may more easily select a desired filter to be applied to the entirety or a certain range of the raw data.

Referring to FIG. 2, the tomographic image processing apparatus 100*a* according to one embodiment may include a processor 220 and a display 230. However, embodiments are not limited thereto, and the tomographic image processing apparatus 100*a* may include additional components than those shown in FIG. 2.

Configurations and functions of the processor 220 and the display 230 will now be described in more detail.

The processor 220 performs predetermined processing based on a received user input. The processor 220 may be implemented in various combinations of at least one memory and at least one processor. For example, a memory may store a program module, and the processor 220 may process operations of the program module.

According to an embodiment, the processor 220 generates, in response to a user input for selecting a cross-section of the object, a plurality of preview images by applying a plurality of filters to second raw data corresponding to the selected cross-section of the object.

According to an embodiment, first raw data refers to the entire raw data acquired by performing tomographic scanning on the object. For example, the first raw data may include raw data corresponding to the region of the object that was scanned.

On the other hand, second raw data refers to raw data corresponding to a cross-section of the object, which is selected by the user from the scanned region of the object. In other words, the second raw data may be a portion of the first raw data. However, embodiments are not limited thereto, and the relationship between the first raw data and the second raw data may vary depending on how the object was scanned.

A tomographic image reconstructed from the first raw data may have a different resolution than that of a preview image generated based on the second raw data. For example, the tomographic image reconstructed from the first raw data may have a higher resolution than that of the preview image.

The processor 220 may generate a preview image by reconstructing an image having the same resolution as that of the tomographic image reconstructed from the first raw data by applying a filter to the second raw data, and sampling the reconstructed image. The processor 200 then may sample the reconstructed image.

According to an embodiment, the processor 220 may reconstruct an image having the same resolution as that of the preview image by applying a filter to the second raw data. In this case, the processor 220 does not need to additionally perform sampling, and the reconstructed image may be the preview image. A process of generating a plurality of preview images will be described in detail below with reference to FIGS. 4 and 5.

The plurality of preview images are not prestored in a database of the tomographic image processing apparatus 100*a* but are generated based on raw data acquired by performing tomographic scanning on the object. Thus, the user may preview, based on the plurality of preview images, tomographic images that are reconstructed when each filter is applied to the first raw data. Furthermore, the user may more easily select a filter by examining the plurality of preview images.

As described above, according to an embodiment, the processor 220 performs predetermined processing based on a received user input. For example, the user input may be received via a key, a trackball, a button, a touch screen, a touch sensor, a touch pad, a mouse, a stylus pen, a microphone, or any combination thereof.

A user input may include various user inputs for controlling operations of the tomographic image processing apparatus 100*a*. For example, the user input may include user inputs for controlling operations such as scanning, data reproduction, and data transmission/reception. The processor 220 may also operate in response to the received user input.

According to an embodiment, the user input may include a user input for selecting a cross-section of the object. The selected cross-section of the object may be a cross-section that is selected from a scanned region of the object and used to generate the plurality of preview images by applying a plurality of filters to raw data corresponding to the cross-section.

A region of the object with respect to which the raw data is to be acquired may vary according to the part of the object that is scanned. Furthermore, if the region of the object with respect to which the raw data is to be acquired changes, the segment of the object depicted in the corresponding tomographic image may change accordingly. A segment may refer to a part of the object such as liver, stomach, heart, or bone.

For example, the tomographic image processing apparatus 100*a* may acquire first raw data corresponding to an abdomen of the user by performing tomographic scanning on the abdomen. Then, the user may select a cross-section of the object that is used to generate preview images from the abdomen region. The processor 220 may then generate a plurality of preview images by applying a plurality of filters to the second raw data corresponding to the selected cross-section of the object.

The user input for selecting the cross-section of the object may include an input for selecting one cross-section of the object from a scout image. For example, the user may move an indicator indicating the location of the cross-section to a desired position in the scout image. Then, the user may select the cross-section of the object at that location via a mouse or button. The indicator may be a line or arrow indicating the location of the cross-section of the object in the scout image. However, other embodiments of the indicator are possible.

As another example, the user input for selecting the cross-section of the object may include an input for selecting a segment. If the user selects a segment in order to view the preview images thereof, the cross-section of the object may be selected from the region of the object representing the selected segment according to a preset criterion. For example, if the user selects the liver, the corresponding cross-section may be preset to be at the center of the liver. However, the user input for selecting the cross-section of the object is not limited to the examples above.

According to an embodiment, an additional user input may include a user input for selecting one of a plurality of preview images. For example, the user input for selecting a preview image may include a touch input for selecting one of the plurality of preview images via a touch screen or touch pad. As another example, the user input for selecting a preview image may be an input for selecting one of the plurality of preview images via a trackball or button. Additional embodiments of the user input are possible. The processor 220 may reconstruct, in response to the user input for selecting the preview image, a tomographic image by applying the filter used to generate the selected preview image to first raw data.

As described above, the first raw data may be the entire raw data acquired by the tomographic scanning on the object. For example, if tomographic scanning is performed on the abdomen, the first raw data may include raw data corresponding to a region representing the abdomen. As another example, if tomographic scanning is performed on the brain, the first raw data may include raw data corresponding to a region representing the brain.

The user may select a filter to be applied to the first raw data by selecting one of a plurality of preview images. In detail, the user may select a preview image having a desired effect or quality from among the plurality of preview images. The processor 220 may reconstruct a tomographic image by applying the filter applied to the selected preview image to the first raw data, to thereby generate a tomographic image having the user's desired effect or quality.

The processor 220 may reconstruct tomographic images by using various reconstruction methods. For example, the processor 220 may reconstruct tomographic images by using filtered back-projection (FBP) or iterative reconstruction (IR), but embodiments are not limited thereto. Since methods of reconstructing tomographic images are widely known to those of ordinary skill in the art, detailed descriptions thereof will be omitted herein.

The display 230 displays tomographic images reconstructed by the processor 220.

When the display 230 is a touch screen, the display 230 may be used as an input device as well as an output device. The display 230 may be a liquid crystal display (LCD), a thin film transistor-LCD (TFT-LCD), an organic light-emitting diode (OLED), a flexible display, a 3D display, or an electrophoretic display. Furthermore, the tomographic image processing apparatus 100a may include two or more displays 230 according to its implemented configuration.

According to an embodiment, the display 230 may display the plurality of preview images generated by the processor 220. If the display 230 is a touch screen, it may also allow the user to select one of the plurality of preview images. The display 230 may display the plurality of preview images in a separate pop-up window, but embodiments are not limited thereto.

According to an embodiment, the display 230 may display the plurality of preview images together with a scout image indicating the location of the selected cross-section of the object. For example, the location of the selected cross-section of the object may be indicated as a line, an arrow, etc., on the scout image.

According to an embodiment, the display 230 may display, in response to a user input for selecting another cross-section of the object, another plurality of preview images corresponding to the other cross-section of the object. For example, in response to a user input for changing from a first cross-section to a second cross-section, the display 230 may display a plurality of preview images corresponding to the second cross-section.

Figure 3:
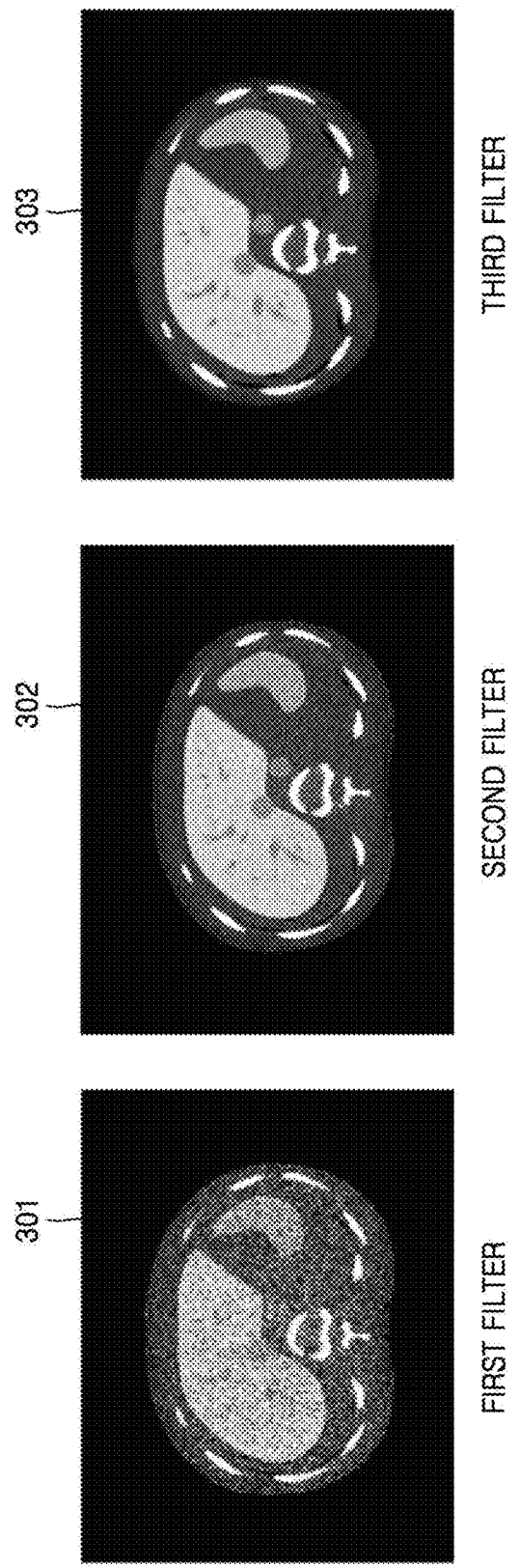
FIG. 3 is diagrams showing a plurality of filters applied to raw data according to an embodiment.

FIG. 3 is diagrams showing a plurality of filters applied to raw data according to an embodiment.

The tomographic image processing apparatus 100a may improve the quality of the final generated tomographic image by applying various types of filters to the raw data. The filter may be distinguished from scan parameters (e.g., tube voltage, tube current, etc.) that determine the scanning conditions during the tomographic scanning of the object.

For example, the tomographic image processing apparatus 100a may reconstruct a tomographic image by applying a Sharp filter to the raw data in order to clearly depict the tissue of the object in the tomographic image. As another example, the tomographic image processing apparatus 100a may reconstruct a tomographic image by applying a Bone filter to raw data in order to emphasize regions corresponding to bones. However, the type and name of a filter are not limited to the examples above and may vary according to various embodiments.

The filters to be applied to the raw data may vary depending on which part of the object was scanned. For example, if tomographic scanning is performed on the abdomen, certain filters may be applied. If tomographic scanning is performed on the head, other filters may be applied. These filters may include, but are not limited to, filters for more clearly depicting the object, filters for reducing noise, filters for emphasizing soft tissue, filter for emphasizing bones, etc.

According to an embodiment, for two different preview images, the tomographic image processing apparatus 100a may apply the same type of filter but at different values, where the filter having the higher value may have a greater effect. For example, in the case of using a filter for reducing noise, when a value of +3 is applied to the filter, greater noise reduction is achieved than when applying a filter with a value of +1. Thus, when reconstructing a tomographic image in which noise level is considered a critical factor, the processor 220 may generate a plurality of preview images by applying a plurality of noise-reducing filters having different values so as to allow the user to select the preview image having the desired noise level from among the plurality of preview images. Thereafter, the processor 220 may reconstruct the tomographic image by applying the filter with the selected value to the first raw data.

For example, the processor 220 may generate a plurality of preview images by applying a plurality of filters to the second raw data, which corresponds to a selected cross-section in the abdomen region of the object. Referring to FIG. 3, the processor 220 may generate first through third preview images 301 through 303 by respectively applying first through third filters to the second raw data. The first through third preview images 301 through 303 may exhibit different sharpness and noise levels. The user may select one preview image from among the first through third preview images 301 through 303. For example, if the second preview image 302 is selected, the processor 220 may reconstruct the tomographic image by applying the second filter used to generate the second preview image 302 to the first raw data.

A set of filters to be differentially applied according to a scanned part of the object may be stored in a memory of the tomographic image processing apparatus 100a during an initial process. Alternatively, according to another embodiment, the tomographic image processing apparatus 100a may allow the user to select, from among all applicable filters, a plurality of filters to be used to generate only preview images that the user desires to view. Then, the processor 220 may generate the plurality of preview images by applying the plurality of filters selected by the user to the second raw data.

Figure 4:
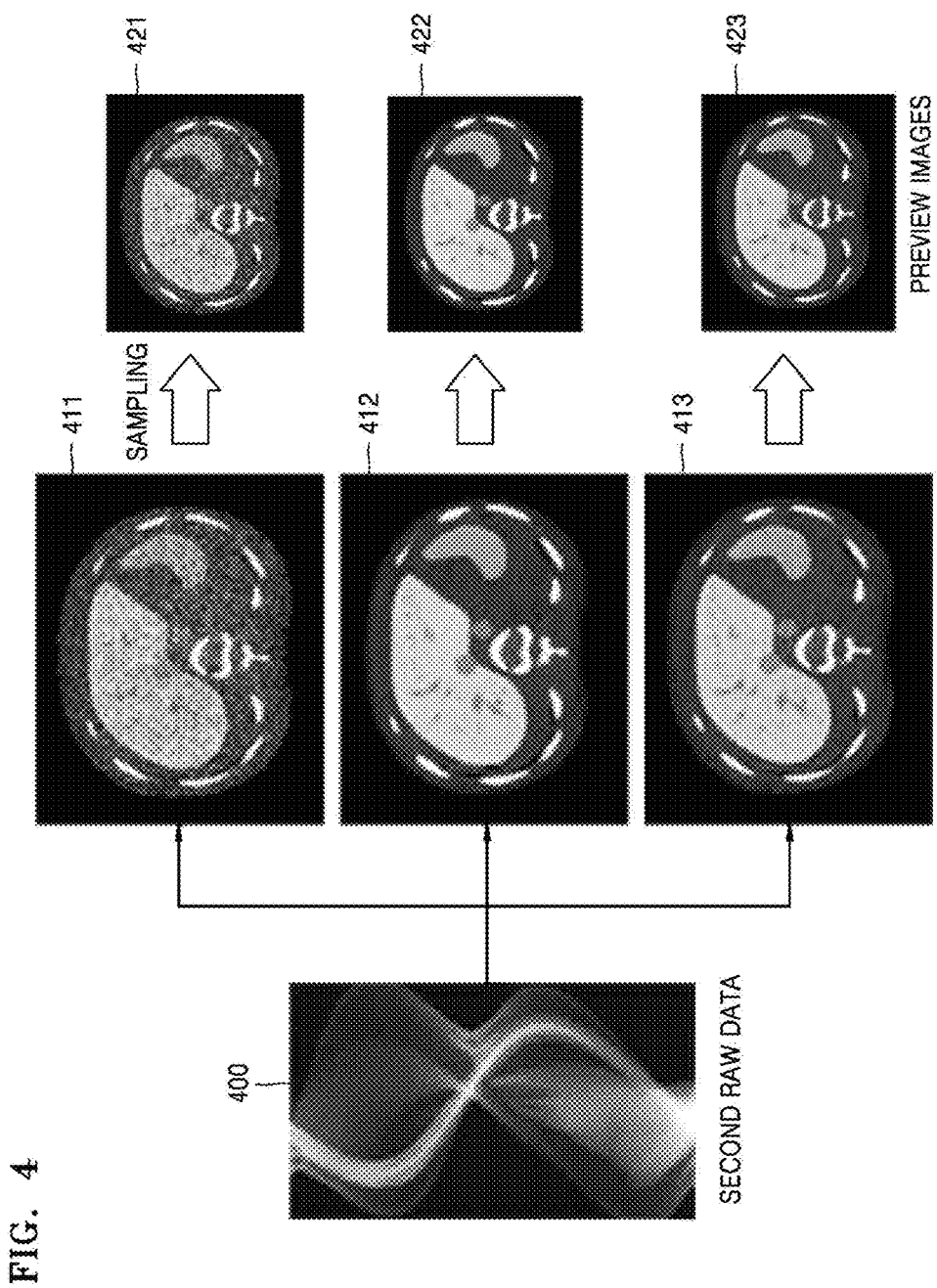
FIG. 4 illustrates a process of generating a plurality of preview images according to an embodiment.

FIG. 4 illustrates a process of generating a plurality of preview images according to an embodiment.

The processor 220 may reconstruct images by applying a plurality of filters to the second raw data and sample the reconstructed images.

For example, the processor 220 may reconstruct images to have the same resolution as that of the tomographic image reconstructed from the first raw data and then sample the reconstructed image. Thus, the processor 220 may generate preview images having lower resolutions than that of the tomographic image reconstructed from the first raw data. For example, as shown in FIG. 4, if tomographic images reconstructed from the first raw data has a resolution of 640×320, the processor 220 may reconstruct first through third images 411 through 413 having the resolution of 640×320 by applying a plurality of filters to the second raw data 400. The processor 220 may then sample the first through third images 411 through 413 to respectively generate a plurality of preview images 421 through 423. In this case, the processor 220 may sample the first through third images 411 through 413 at a resolution (e.g., 50×50) of the plurality of preview images 421 through 423 displayed on the display 230. However, resolutions of preview images and tomographic images are not limited to the example above and may vary across embodiments.

Figure 5:
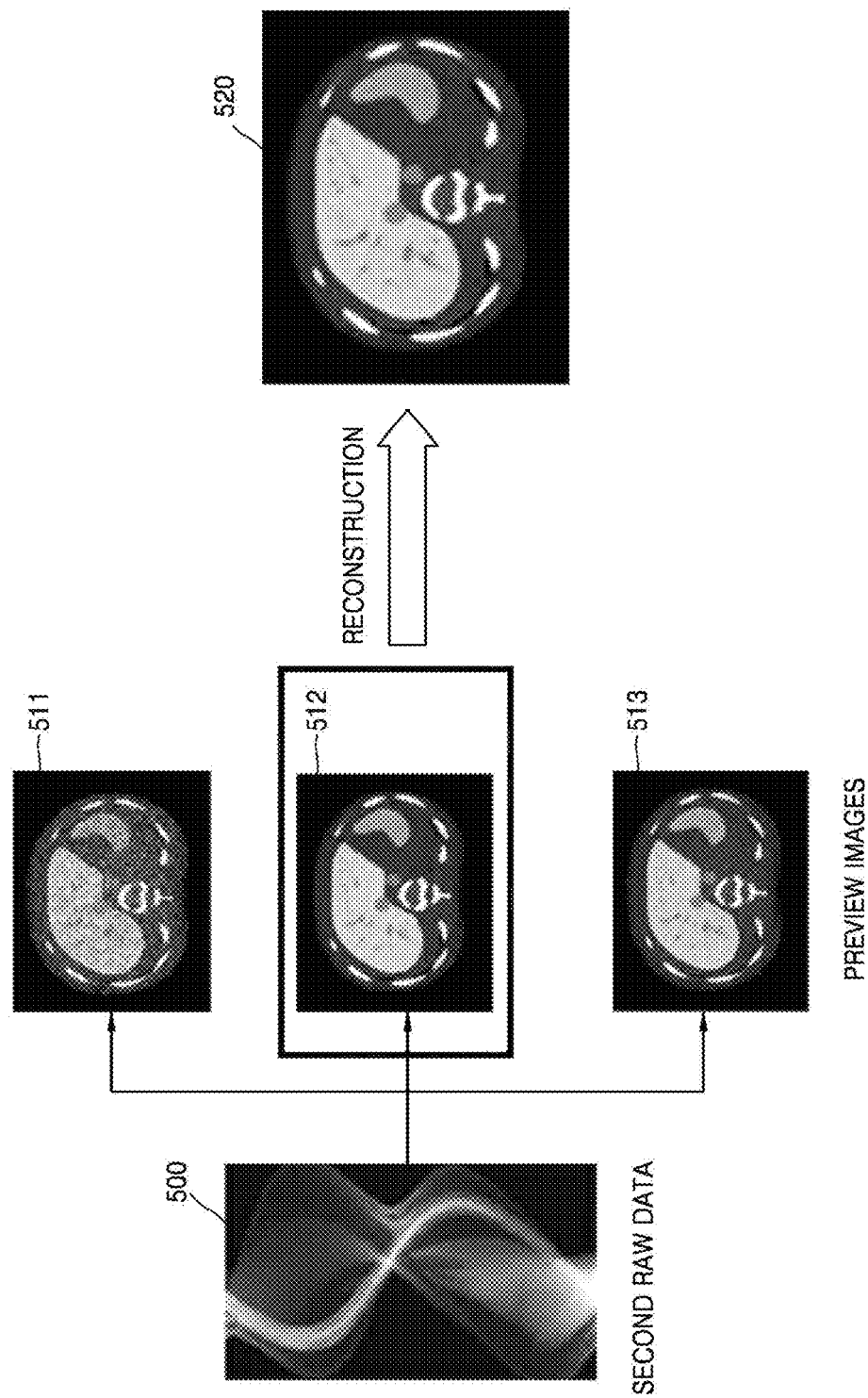
FIG. 5 illustrates a process of generating a plurality of preview images according to another embodiment.

FIG. 5 illustrates a process of generating a plurality of preview images according to another embodiment.

Unlike in FIG. 4, the processor 220 may reconstruct images to have the same resolution as that of preview images by applying a plurality of filters to second raw data 500. For example, the tomographic image processing apparatus 100a may display a tomographic image 520 reconstructed from the first raw data at a resolution of 640×320 and first through third images 511 through 513 at a resolution of 50×50. Referring to FIG. 5, the processor 220 may reconstruct the first through third images 511 through 513 having the resolution of 50×50 by applying first through third filters to the second raw data 500. The process shown in FIG. 5 is different from that shown in FIG. 4 in that the processor 220 does not need to additionally perform sampling on the first through third images 511 through 513, and the first through third images 511 through 513 may be used as the plurality of preview images. Thus, the process may reduce the number of computations performed by the processor 220 and the time required to generate preview images, compared to that described with reference to FIG. 4.

The processor 220 may reconstruct the tomographic image 520 by applying, to the first raw data, the second filter which is used to generate the second image 512. Referring to FIG. 5, the processor 220 does not reconstruct images having the resolution of 640×320 based on the second raw data 500 while generating the plurality of preview images. Thus, unlike in FIG. 4, it may be necessary to reconstruct images having the resolution of 640×320 based on the second raw data 500 during reconstruction of the tomographic image 520 from the first raw data. The resolutions of the tomographic image 520 and the preview images (511 through 513) are not limited to the example above and may vary across embodiments.

Figure 6:
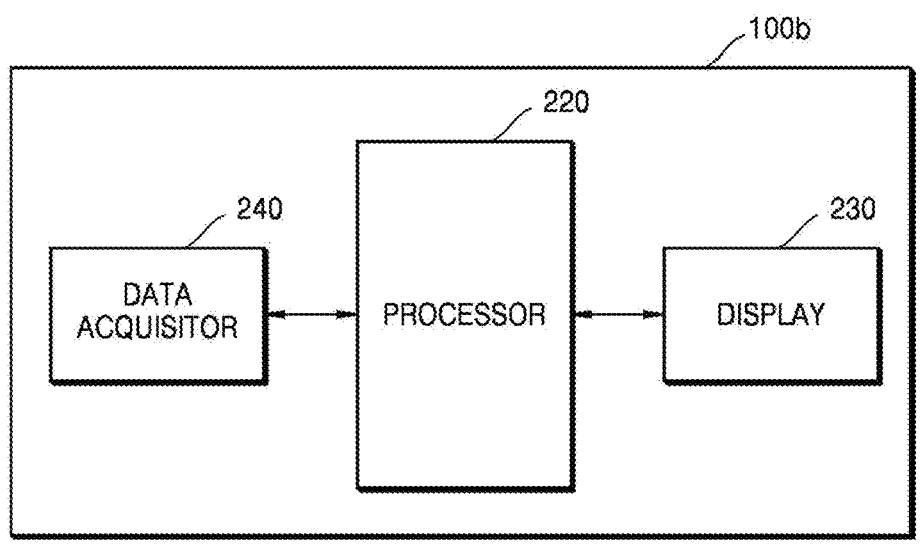
FIG. 6 is a block diagram of a configuration of a tomographic image processing apparatus according to another embodiment.

FIG. 6 is a block diagram of a configuration of a tomographic image processing apparatus 100b according to another embodiment.

Referring to FIG. 6, unlike the tomographic image processing apparatus 100a, the tomographic image processing apparatus 100b may further include a data acquisitor 240. Descriptions of the processor 220 and the display 230 that are already provided above with respect to FIG. 2, and therefore are omitted here.

According to an embodiment, the data acquisitor 240 may acquire the first raw data by performing tomographic scanning on the object.

The data acquisitor 240 may include the gantry 110 of the CT system 100 described with reference to FIG. 1. Thus, the data acquisitor 240 may include the rotating frame 111, the X-ray generator 112, the X-ray detector 113, the rotation driver 114, and the readout device 115.

The processor 220 may generate preview images by applying a plurality of filters to the second raw data corresponding to one selected cross-section of the object among the first raw data acquired by the data acquisitor 240.

Figure 7A:
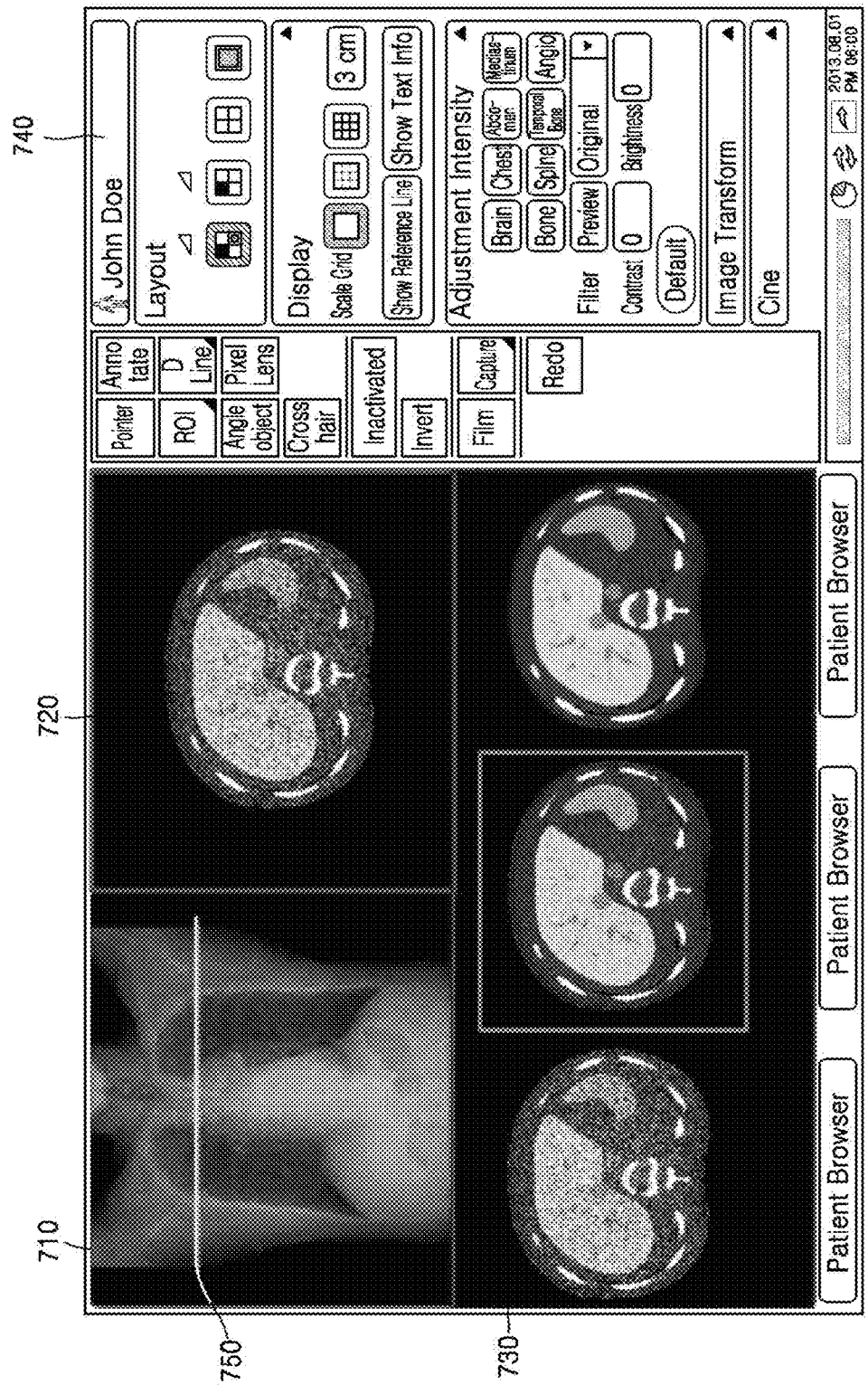
FIG. 7A and FIG. 7B are exemplary displays in which a plurality of preview images are displayed according to embodiments.
Figure 7B:
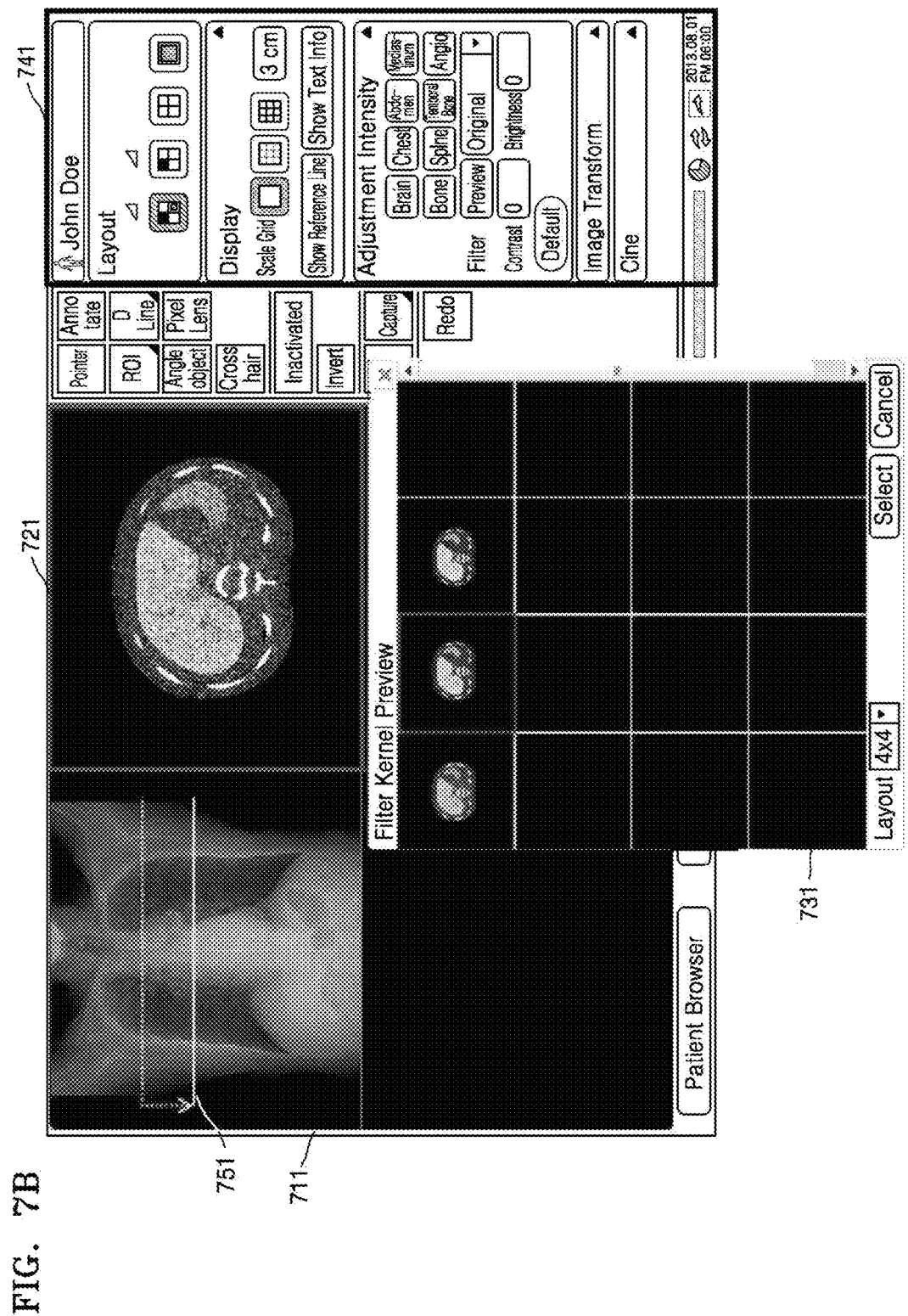

FIGS. 7A and 7B are exemplary displays in which a plurality of preview images are displayed by the tomographic image processing apparatus 100a or 100b, according to embodiments.

The display 230 may display a plurality of preview images generated by applying a plurality of filters to the second raw data. Referring to FIG. 7A, the display 230 may display a scout image 710 indicating the location of a selected cross-section of the object. The display 230 may further display the corresponding plurality of preview images 730. The location of the selected cross-section of the object may be indicated by an indicator on the scout image 710. For example, the indicator may be a line 750 indicating the location of the selected cross-section of the object.

According to an embodiment, as shown in FIG. 7A, the display 730 may display another preview image 720 generated by applying a default filter in addition to the plurality of preview images 730.

According to another embodiment, the display 230 may display the preview image 720 generated by applying a last used filter. For example, if tomographic scanning is performed on the abdomen of the object, the display 230 may display the preview image 720 generated by applying the filter used during the last tomographic scanning of the abdomen.

According to one embodiment, the user may first view the preview image 720 and then determine whether to apply another filter. When the preview image 720 has image quality higher than or equal to a threshold level, the tomographic image may be reconstructed by applying the filter to the first raw data.

Furthermore, the display 230 may display a user interface 740 configured to control operations related to generation and display of preview images.

According to an embodiment, as shown in FIG. 7B, the display 230 may display a plurality of preview images in a separate pop-up window 731. However, the present disclosure is not limited hereto.

Figure 8A:
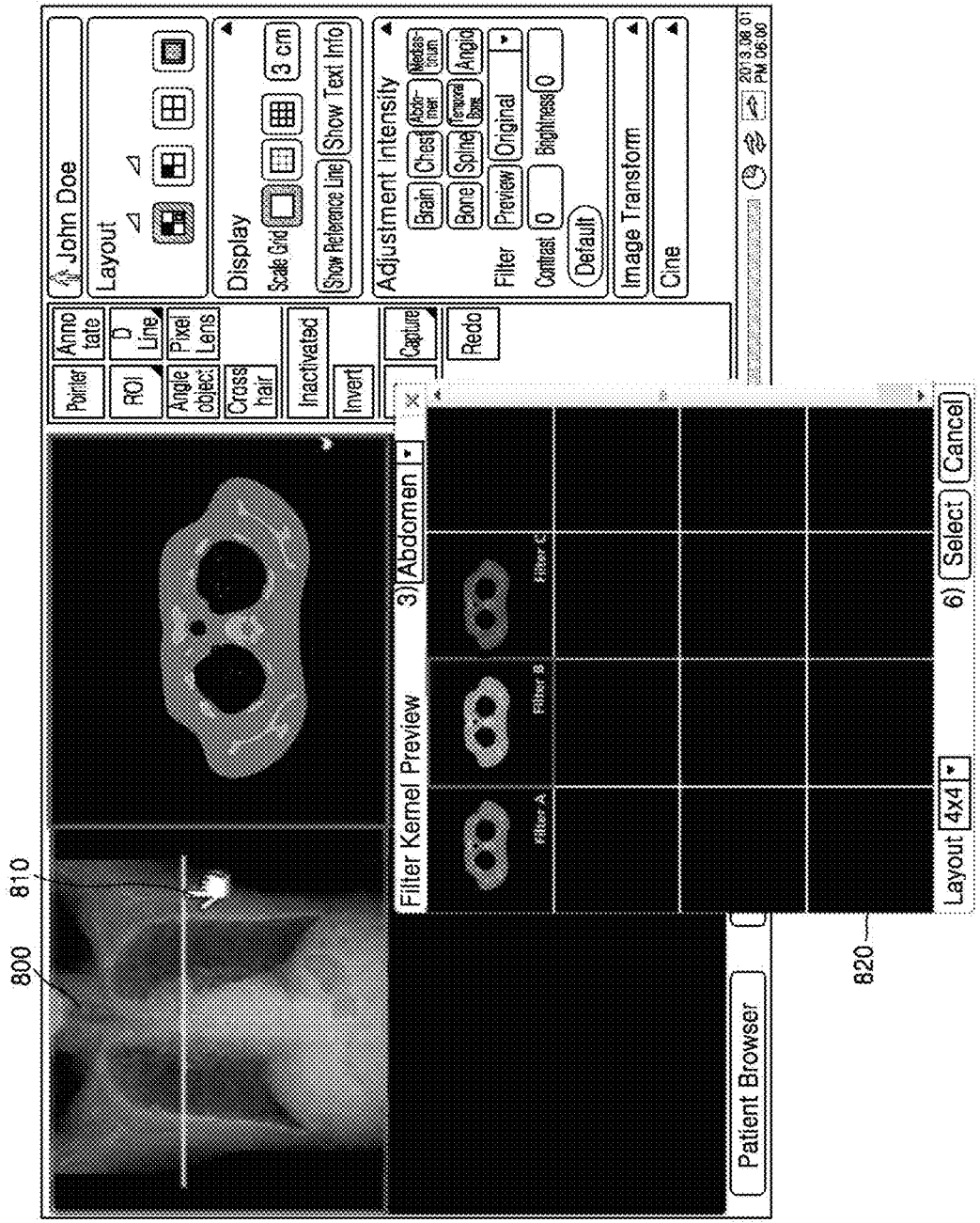
FIG. 8A and FIG. 8B are exemplary displays showing a process of updating a plurality of preview images according to a user input, where the user input selects another cross-section of an object, according to an embodiment.
Figure 8B:
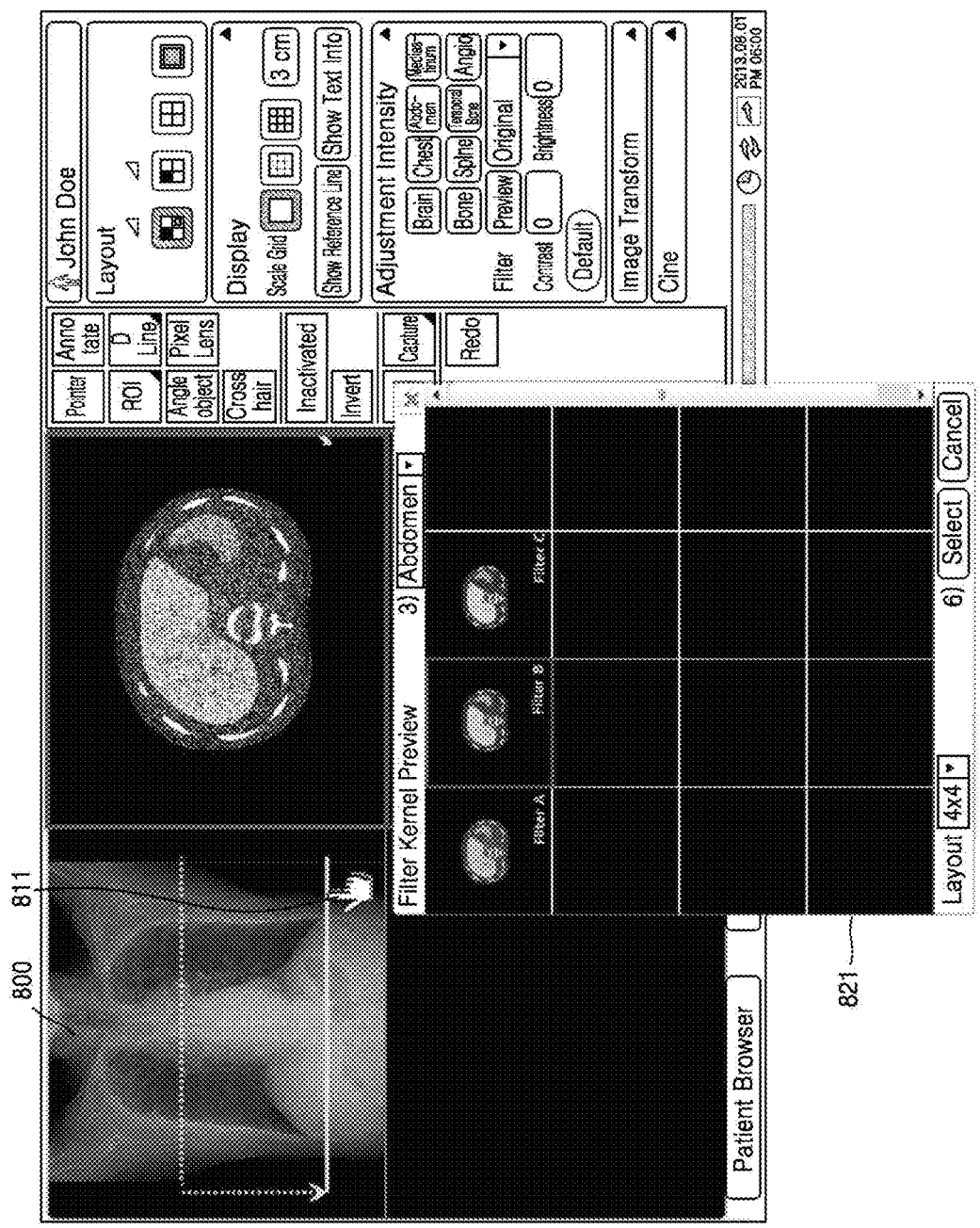

FIGS. 8A and 8B are exemplary displays showing a process of updating a plurality of preview images according to a user input, where the user input selects another cross-section of an object, according to an embodiment.

According to an embodiment, the processor 220 may update, in response to a user input for selecting another cross-section of the object, the plurality of preview images to correspond to the other cross-section of the object. For example, referring to FIG. 8A, if a user input 810 for selecting a first cross-section from the scout image 800 is received, the processor 220 may generate a plurality of preview images 820 corresponding to the first cross-section. Furthermore, the display 230 may display the generated preview images 820.

Referring to FIG. 8B, when a user input 811 for changing from the first cross-section to a second cross-section is received, the processor 220 may update the plurality of preview images 820 corresponding to the first cross-section with a plurality of preview images 821 corresponding to the second cross-section. For example, the user input 811 for changing from the first-cross-section to the second cross-section may include an input for moving the indicator indicating the location of the selected cross-section of the object in the scout image 800 (801). However, the present disclosure is not limited hereto.

Furthermore, the display 230 may display the plurality of preview images 821 corresponding to the second cross-section.

Figure 9:
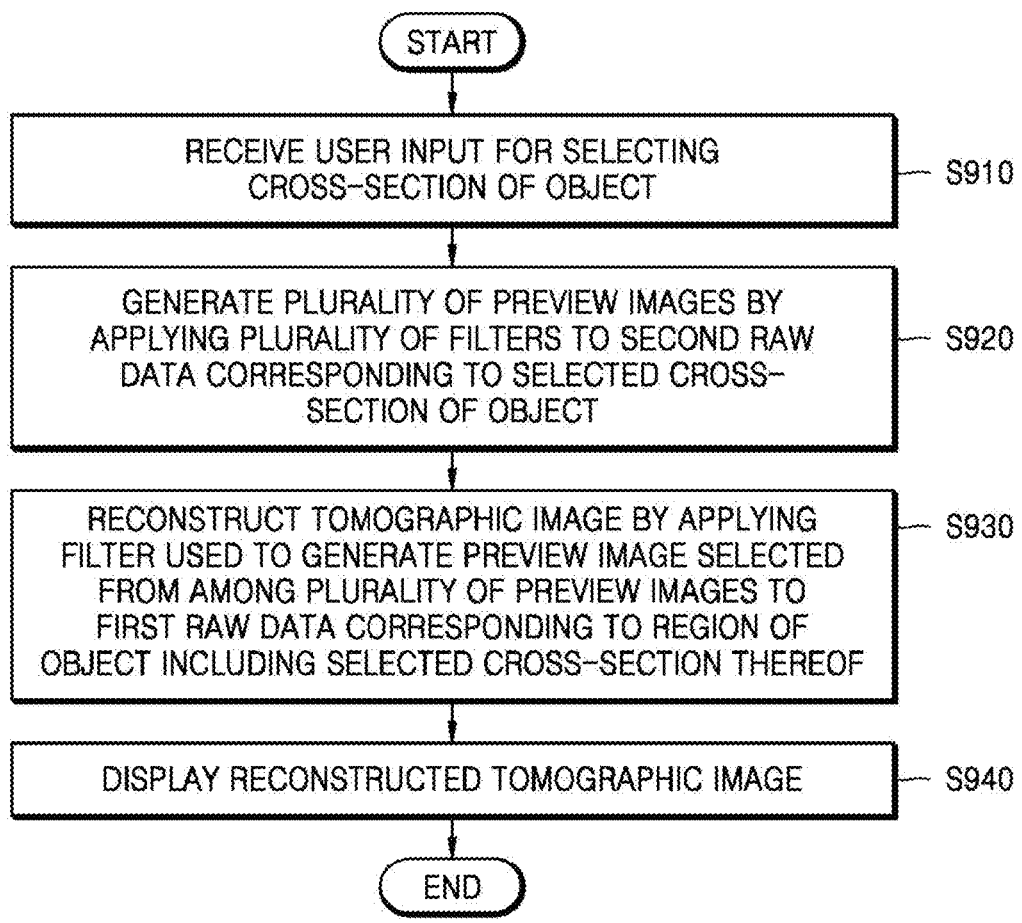
FIG. 9 is a flowchart of a tomographic image processing method according to an embodiment.

FIG. 9 is a flowchart of a tomographic image processing method according to an embodiment.

Operations of tomographic image processing methods according to the disclosed embodiments may be performed by an electronic device equipped with a processor and a display and which is capable of performing image processing. In the present specification, it is described that the tomographic image processing apparatus 100*a* performs tomographic image processing methods according to embodiments. Thus, the descriptions with respect to the tomographic image processing apparatus 100*a* may be applied to tomographic image processing methods disclosed herein, and descriptions with respect to the tomographic image processing methods may be applied to the tomographic image processing apparatus 100*a* disclosed herein. However, embodiments are not limited thereto, and the tomographic image processing methods according to the embodiments may be performed by other various types of electronic devices.

Referring to FIG. 9, in operation S910, the tomographic image processing apparatus 100*a* may receive a user input for selecting a cross-section of an object.

As described above, the region of the object with respect to which raw data is to be acquired may vary depending on the part of the object to be scanned. For example, by performing tomographic scanning on the abdomen, the tomographic image processing apparatus 100*a* may acquire first raw data corresponding to the abdomen region. The user may then select a cross-section of the object to be used for generating preview images from the abdomen region.

The user input for selecting a cross-section of the object may include an input for moving an indicator to a desired cross-section of the object in a scout image and then selecting the cross-section of the object where the indicator is located via a mouse or button.

As another example, the user input for selecting a cross-section of the object may include an input for selecting a segment of the object. If the user selects a segment in order to view a preview image thereof, one cross-section of the object may be selected from a region of the object representing the selected segment according to a preset criterion. For example, if the user selects the lungs, the cross-section may be preset to be at the middle of the lungs. However, the present disclosure is not limited to the embodiments described above.

In operation S920, the tomographic image processing apparatus 100*a* generates a plurality of preview images by applying a plurality of filters to the second raw data corresponding to the selected cross-section of the object.

For example, the tomographic image processing apparatus 100*a* may generate a preview image by reconstructing an image having the same resolution as that of a tomographic image reconstructed from the first raw data by applying a filter to the second raw data and sampling the reconstructed image.

Alternatively, according to an embodiment, the tomographic image processing apparatus 100*a* may reconstruct images having the same resolution as that of the preview images by applying a plurality of filters to the second raw data. In this case, the tomographic image processing apparatus 100*a* does not need to additionally perform sampling, and the reconstructed images may be preview images.

In operation S930, the tomographic image processing apparatus 100*a* reconstructs the tomographic image by applying the filter that is used to generate the preview image selected by the user. For example, if tomographic scanning is performed on the abdomen, the first raw data may include raw data corresponding to the abdomen region. If tomographic scanning is performed on the brain, the first raw data may include raw data corresponding to the brain region.

The user may select the filter to be applied to the first raw data by selecting one of the plurality of preview images. The user may select the preview image having the desired effect or quality from among the plurality of preview images. Furthermore, the tomographic image processing apparatus 100*a* may reconstruct the tomographic image by applying the filter corresponding to the selected preview image to the first raw data, to thereby generate a tomographic image having the user's desired effect or quality.

In operation S940, the tomographic image processing apparatus 100*a* displays the reconstructed tomographic image.

Figure 10:
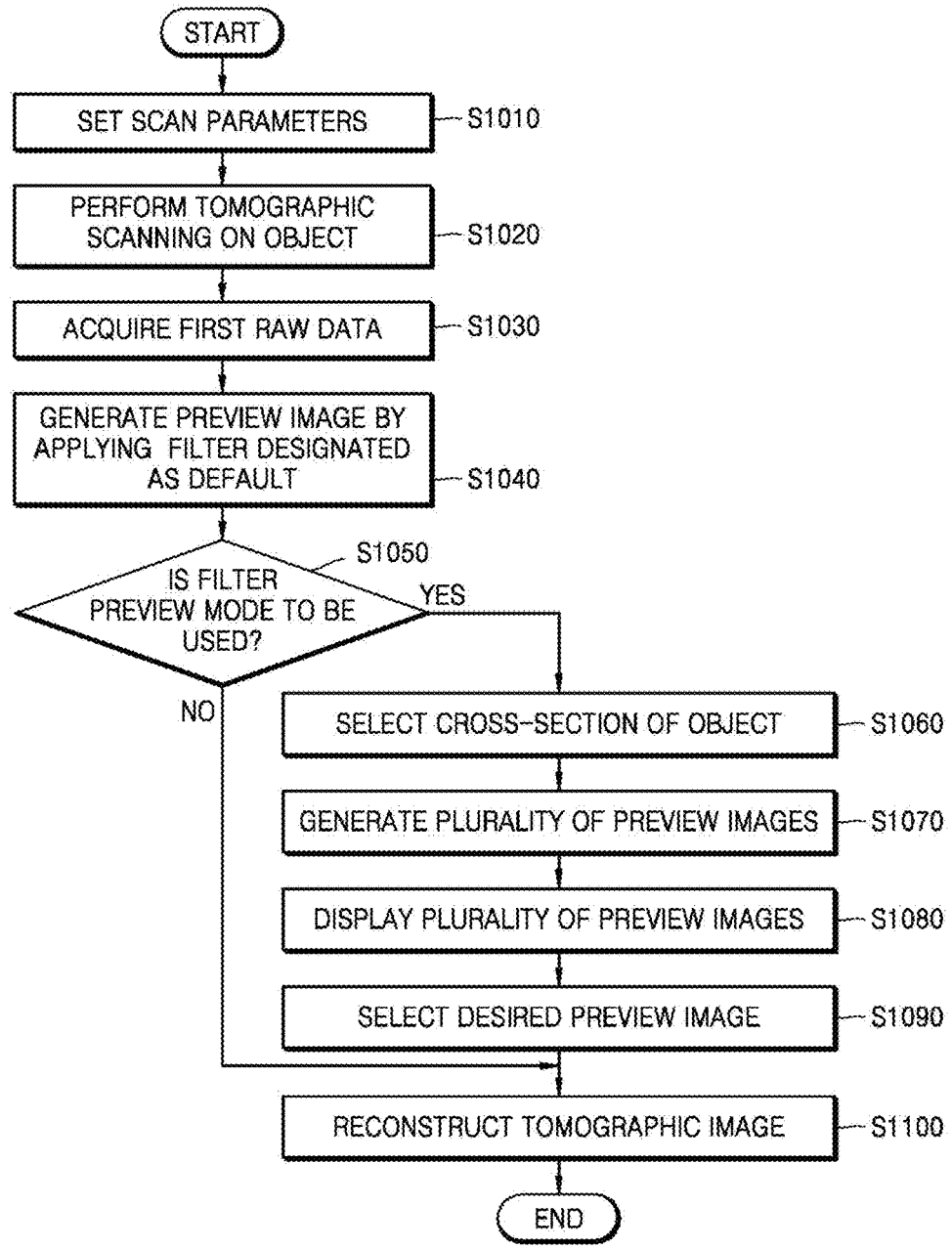
FIG. 10 is a flowchart of a tomographic image processing method according to another embodiment.

FIG. 10 is a flowchart of a tomographic image processing method according to another embodiment.

According to an embodiment, before generating the plurality of preview images, the tomographic image processing apparatus 100*a* may generate a preview image by applying a default filter and display the generated preview image.

The user may first view the default preview image and then determine whether to apply the default filter or another filter to first raw data for reconstruction.

If the default preview image has an image quality higher than or equal to a threshold level, the tomographic image processing apparatus 100*a* may reconstruct the tomographic image by applying the default filter to the first raw data. Otherwise, if the generated preview image has a lower quality than the threshold level, the tomographic image processing apparatus 100*a* may generate a plurality of preview images by applying a plurality of filters and display the generated preview images.

Hereinafter, for convenience, the mode in which the tomographic image processing apparatus 100*a* generates a plurality of preview images is referred to as a "filter preview mode."

The user may select a preview image having the desired effect or quality from among the plurality of preview images. Furthermore, the tomographic image processing apparatus 100*a* may reconstruct the tomographic image by applying a filter corresponding to the selected preview image to the first raw data. When the preview image generated by applying the default filter has an image quality higher than or equal to the threshold level, the tomographic image processing apparatus 100*a* may reconstruct the tomographic image by applying the default filter to the first raw data. Thus, when the default preview image has a certain image quality, the tomographic image processing apparatus 100*a* does not need to generate the plurality of preview images, and accordingly the amount of time required to reconstruct the tomographic image may be reduced.

The above-described tomographic image processing method will now be described in more detail with reference to FIG. 10.

Referring to FIG. 10, in operation S1010, the tomographic image processing apparatus 100*a* may set scan parameters.

The scan parameters may be parameters that are used to determine scanning conditions for the tomographic scanning of the object. For example, the scan parameters may include tube voltage (kVp) and tube current (mA), etc.

The tomographic image processing apparatus 100a may perform tomographic scanning on the object using the set scan parameters (S1020) and acquire the first raw data (S1030). For example, if tomographic scanning is performed on the abdomen, the first raw data may include raw data corresponding to the abdomen region. If tomographic scanning is performed on the brain, the first raw data may include raw data corresponding to the brain region.

In operation S1040, the tomographic image processing apparatus 100a may generate a preview image by applying a default filter.

The tomographic image processing apparatus 100a may allow the user to select a cross-section of the object to be used for generating the preview image using the default filter. However, the present disclosure is not so limited.

In operation S1050, the tomographic image processing apparatus 100a may determine whether to use a filter preview mode based on the quality of the default preview image generated using the default filter.

For example, the tomographic image processing apparatus 100a may receive a user input for selecting the filter preview mode based on the quality of the default preview image. Alternatively, the tomographic image processing apparatus 100a may receive a user input for selecting the operation of reconstructing a tomographic image using the default filter.

If the quality of the default preview image is higher than or equal to a threshold level, the filter preview mode may not be used. In this case, the tomographic image processing apparatus 100a may reconstruct a tomographic image using the default filter (S1100). Otherwise, if the filter preview mode is used, the tomographic image processing apparatus 100a may receive a user input for selecting a cross-section of the object in order to generate a plurality of preview images (S1060).

In operation S1070, the tomographic image processing apparatus 100a may generate a plurality of preview images by applying a plurality of filters to the second raw data corresponding to the selected cross-section of the object. Then, in operation S1080, the tomographic image processing apparatus 100a may display the generated plurality of preview images.

In operation S1090, the tomographic image processing apparatus 100a may receive a user input for selecting one of the plurality of preview images. When one of the plurality of preview images is selected, the filter corresponding to the selected preview image may be applied to the first raw data.

In operation S1100, the tomographic image processing apparatus 100a may reconstruct the tomographic image by applying the filter corresponding to the selected preview image to the first raw data.

Figure 11:
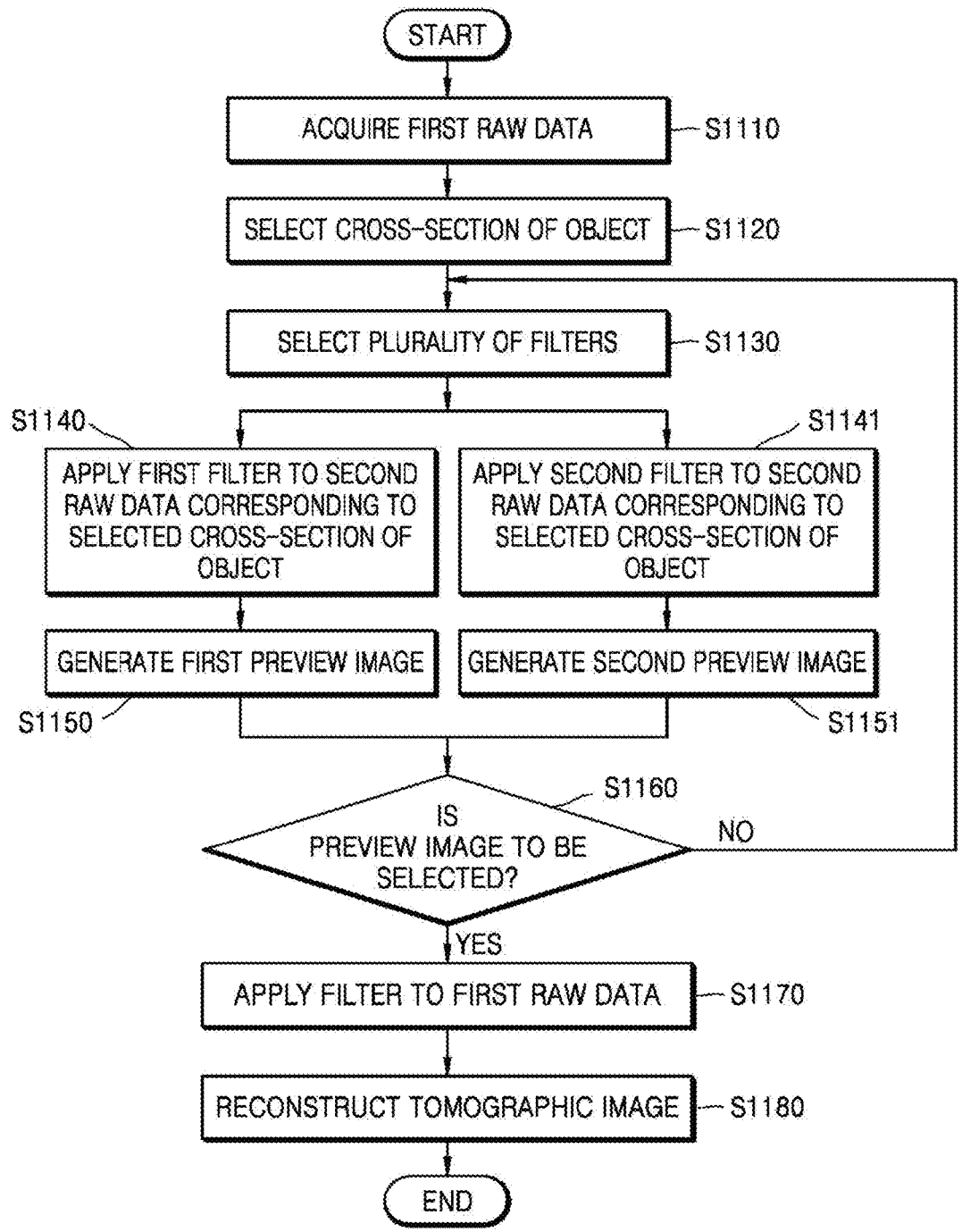
FIG. 11 is a flowchart of a tomographic image processing method according to yet another embodiment.

FIG. 11 is a flowchart of a tomographic image processing method according to yet another embodiment.

According to an embodiment, the tomographic image processing apparatus 100a may generate preview images by applying different filters according to a scanned part of the object. In this case, filters applicable to the scanned part of the object may be digital filters stored in a memory of the tomographic image processing apparatus 100a. Thus, if a part of the object to be scanned is determined, the tomographic image processing apparatus 100a may check for the presence of filters applicable to the part of the object to be scanned in the memory. Furthermore, the tomographic image processing apparatus 100a may generate a plurality of preview images by applying filters applicable to the scanned part of the object.

As another example, the tomographic image processing apparatus 100a may allow the user to select a plurality of filters to be used for generating a plurality of preview images. The user may select a plurality of filters to generate a plurality of preview images, so that characteristics of the preview images may be compared by the user. Furthermore, the tomographic image processing apparatus 100a may generate a plurality of preview images by applying the plurality of filters selected by the user. Thus, the user may effectively compare the selected plurality of filters with one another and more easily select a filter to be applied to the first raw data.

The above-described tomographic image processing method will now be described in more detail with reference to FIG. 11.

Referring to FIG. 11, in operation S1110, the tomographic image processing apparatus 100a may acquire the first raw data by performing tomographic scanning of an object.

In operation S1120, the tomographic image processing apparatus 100a may receive a user input for selecting a cross-section of the object to be used for generating a plurality of preview images.

For example, the user input for selecting a cross-section of the object may include an input for selecting a desired cross-section of the object from a scout image. As another example, the user input for selecting a cross-section of the object may include an input for selecting a segment of the object (e.g. lungs) that the user desires in the scout image.

In operation S1130, the tomographic image processing apparatus 100a may receive a user input for selecting a plurality of filters that are to be used for generating a plurality of preview images.

The tomographic image processing apparatus 100a may apply the selected plurality of filters (e.g., first and second filters) to the second raw data corresponding to the selected cross-section of the object (S1140 and S1141) and generate a plurality of preview images (e.g., first and second preview images), respectively (S1150 and S1151).

In operation S1160, the tomographic image processing apparatus 100a may receive a user input for selecting one of the plurality of preview images. The user may select a preview image having a desired effect or quality from among the plurality of preview images.

When one preview image is selected by the user, the tomographic image processing apparatus 100a may apply the filter corresponding to the selected preview image to the first raw data (S1170) to reconstruct a tomographic image (S1180).

However, if the plurality of preview images do not include a preview image having the user's desired effect or quality, the tomographic image processing apparatus 100a may receive a user input for selecting additional filters (e.g., third and fourth filters). Furthermore, the tomographic image processing apparatus 100a may generate a plurality of preview images (e.g., third and fourth preview images) by applying the additional filters to the second raw data and display the generated preview images. By doing so, the user may more accurately select a desired filter from among various filters provided by the tomographic image processing apparatus 100a.

The above-described embodiments of the present disclosure may be embodied in form of a computer-readable recording medium for storing computer executable command languages and data. The command languages may be stored in form of program code and, when executed by a processor, may perform a certain operation by generating a certain program module. Also, when executed by a processor, the command languages may perform certain operations of the disclosed embodiments.

While embodiments of the present disclosure have been particularly shown and described with reference to the accompanying drawings, it will be understood by those of ordinary skill in the art that various changes in form and details may be made therein without departing from the spirit and scope of the invention as defined by the appended claims. The disclosed embodiments should be considered in descriptive sense only and not for purposes of limitation.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. A tomographic image processing apparatus comprising:
a processor configured to:
   display a scout image of an object;
   generate and display a plurality of preview images by applying a plurality of filters to second raw data corresponding to a selected cross-section of an object, wherein the selected cross-section is one slice of the object corresponding to a location selected by a user input on the scout image, wherein each of the plurality of preview images is generated by applying a different one of the plurality of filters to the one slice of the object;
   reconstruct a tomographic image by applying one of the plurality of filters, which is used to generate a preview image selected from among the plurality of preview images, to first raw data corresponding to a region of the object including the selected cross-section; and
a display configured to display the reconstructed tomographic image.

2. The tomographic image processing apparatus of claim 1, wherein the processor is further configured to:
sample the plurality of preview images.

3. The tomographic image processing apparatus of claim 1, wherein the processor is further configured to update the plurality of preview images to correspond to another cross-section of the object in response to receiving a user input of selecting another location about the scout image, thereby causing the selected cross-section to become another one slice corresponding to a plane going through the another location about the scout image.

4. The tomographic image processing apparatus of claim 1, further comprising a data acquisitor configured to:
acquire the first raw data by performing the tomographic scanning on the region of the object; and
transmit the first raw data to the processor.

5. The tomographic image processing apparatus of claim 1, wherein the processor is further configured to:
receive a user input for selecting one of the plurality of preview images; and
reconstruct the tomographic image by apply the filter corresponding to the selected preview image to the first raw data.

6. A tomographic image processing method comprising:
displaying a scout image of an object;
generating and displaying a plurality of preview images by applying a plurality of filters to second raw data corresponding to a selected cross-section of an object, wherein the selected cross-section in one slice of the object corresponding to a location selected by a user input on the scout image, wherein generating the plurality of preview images comprises applying a different one of the plurality of filters to the one slice of the object;
reconstructing a tomographic image by applying one of the plurality of filters, which is used to generate a preview image selected from among the plurality of preview images, to first raw data corresponding to a region of the object including the selected cross-section; and
displaying the reconstructed tomographic image.

7. The tomographic image processing method of claim 6, wherein the generating of the plurality of preview images further comprises:
sampling the plurality of preview images.

8. The tomographic image processing method of claim 6, further comprising:
updating the plurality of preview images to correspond to another cross-section of the object in response to receiving a user input of selecting another location about the scout image, thereby causing the selected cross-section to become another one slice corresponding to a plane going through the another location about the scout image.

9. The tomographic image processing method of claim 6, further comprising:
acquiring the first raw data by performing the tomographic scanning on the region of the object.

10. The tomographic image processing method of claim 6, further comprising:
receiving a user input for selecting one of the plurality of preview images; and
reconstructing the tomographic image by apply the filter corresponding to the selected preview image to the first raw data.

11. A computer program product comprising a non-transitory computer-readable recording medium having recorded thereon computer program code which, when executed by a processor, performs a tomographic image processing method comprising:
displaying a scout image of an object;
generating and displaying a plurality of preview images by applying a plurality of filters to second raw data corresponding to a selected cross-section of an object, wherein the selected cross-section in one slice of the object corresponding to a location selected by a user input on the scout image, wherein generating the plurality of preview images comprises applying a different one of the plurality of filters to the one slice of the object;
reconstructing a tomographic image by applying one of the plurality of filters, which is used to generate a preview image selected from among the plurality of preview images, to first raw data corresponding to a region of the object including the selected cross-section; and displaying the reconstructed tomographic image.

* * * * *